United States Patent [19]

Mlodzikowski et al.

[11] Patent Number: 4,899,388
[45] Date of Patent: Feb. 6, 1990

[54] INFRARED STEREO SPEAKER SYSTEM

[75] Inventors: Allan G. Mlodzikowski, Milwaukee, Wis.; Yih-Pyng Tsui; Hai-Pin Ku, both of Taipei, Taiwan

[73] Assignee: Koss Corporation, Milwaukee, Wis.

[21] Appl. No.: 143,588

[22] Filed: Jan. 13, 1988

[51] Int. Cl.⁴ .......................... H04B 9/00; H04H 5/00
[52] U.S. Cl. .......................................... 381/77; 381/2; 455/343; 455/603; 455/613; 455/617
[58] Field of Search ............... 455/600, 601, 602, 603, 455/608, 617, 618, 619, 343, 613; 358/194.1; 381/2, 3, 4, 77, 80, 82, 105

[56] References Cited

U.S. PATENT DOCUMENTS

| | | | |
|---|---|---|---|
| 3,927,316 | 12/1975 | Citta | 455/608 |
| 4,405,832 | 9/1983 | Sondermeyer | 381/61 |
| 4,513,446 | 4/1985 | Leslie | 455/343 |
| 4,621,374 | 11/1986 | Micic | 455/603 |
| 4,736,461 | 4/1988 | Kawasaki | 455/343 |

Primary Examiner—Tommy P. Chin
Attorney, Agent, or Firm—Fuller, Puerner & Hohenfeldt

[57] ABSTRACT

A stereophonic audio system including a device for providing a stereophonic signal, such as an audio receiver. An infrared transmitter connected to the receiver converts the audio signal to an infrared signal to be radiated throughout a signal area. Within this signal area is disposed a pair of loudspeakers, each selecting a separate portion of the infrared signal, converting that one portion of the infrared signal to an audible sound signal, and radiating the sound throughout a listening area. Each loudspeaker includes a filter for selecting the one infrared signal which applies to it. The transmitter includes a plug engageable with a headphone jack of the receiver for electrically connecting the transmitter to the receiver and an infrared diode array for radiating the signal within the signal area. Each of the loudspeakers includes a photodiode arrangement for receiving the infrared light carrying the transmission signal from the transmitter and passing it to the respective filter, an amplifier for amplifying the signal, and speaker elements for receiving the signal from the amplifier and converting it to sound signals, for radiating in the listening area. To avoid the necessity of any wires leading to the loudspeakers, each is battery operated, and includes a power saver circuit to reduce power loss whenever no signal is received from the transmitter. The transmitter also includes a power saver circuit to disable the diode array whenever it receives no signal from the receiver.

8 Claims, 7 Drawing Sheets

INFRARED STEREO SPEAKER SYSTEM

BACKGROUND OF THE INVENTION

This invention relates to loudspeaker systems for converting an electrical signal, originating at an audio amplifier, to an audio signal to be radiated within a listening area, and in particular to such loudspeaker systems which receive their signal from the audio amplifier without any direct connection by wire.

It is known to transmit information wirelessly by use of infrared light. Very small amounts of information, for example, are transmitted by hand-held remote control devices for televisions, compact disk players and other electronic apparatus. Basically this information is merely comprised of control information, such as changing the channel to which a television is tuned, changing the track which a compact disk player is to play, or adjusting the volume of the device. These control devices are not intended to send continuous signals over a long period of time, but rather short bursts of the control information. Supplying power to the receivers of this information is generally no problem, since the receiving apparatus requires substantially more power for its other components, and so is generally connected to a substantial source of power such as line voltage.

Further, it is known to transmit and receive audio signals use of a carrier in the infrared range. In a brochure entitled "Wireless Communication With Infrared Light", Sennheiser Electronic Corporation, of New York, described a monophonic system wherein audio information was transmitted from a transmitter to a headphone-type receiver for use in listening to the audio information. This system, as mentioned, was monophonic, however, and thus not suitable for use with stereophonic audio information. The demand for a system which can accommodate stereophonic audio information is already great, and it is increasing with the advent of AM stereo radio broadcasting, and particularly with stereo sound for television.

Moreover, with respect to loudspeakers, the wires necessary to transmit the audio signal to the loudspeakers have made the installation of such systems more difficult and less aesthetically pleasing since stereo systems were first introduced. Another problem with transmission of the audio signal by wire is the possibility that the source of the audio signal could overpower a loudspeaker, possibly even damaging the components of the loudspeaker. A demand exists for a loudspeaker system which is capable of providing excellent sound quality without the necessity or possible risk presented by wires transmitting the audio signal to the loudspeaker system.

This invention relates to improvements over the systems described above and to solutions to the problems raised thereby.

SUMMARY OF THE INVENTION

The invention includes a stereophonic audio system including means for providing an electric signal containing stereophonic signal information, such as an audio receiver or amplifier or a stereo television, to name but a few examples. A converting means is included in the invention, and comprises means for electrically connecting it to the providing means. The converting means receives the electric signal, converts it to an infrared signal containing the stereophonic signal information, and radiates the infrared signal throughout a signal area. Within this signal area is disposed a first selecting means, say a left loudspeaker, for selecting one portion of the infrared signal, in this case the left signal, converting that one portion of the infrared signal to a first audible sound signal, and radiating the audible sound signal throughout a listening area, which may or may not be co-extensive with the signal area. Second selecting means, such as a right loudspeaker, is also disposed within the same signal area but separated remotely from the first selecting means. This second selecting means selects a second portion of the infrared signal, in this case the right signal, converts this second portion to a second audible sound signal, and radiates the second audible sound signal throughout the same listening area.

Each selecting means includes filter means for filtering out any infrared signal other than the one portion which applies to it. In a preferred embodiment, the providing means includes a stereo audio amplifier providing a left channel signal and a right channel signal and having a headphone jack for allowing connection to both channels. The converting means includes a plug engageable with the headphone jack for electrically connecting the converting means to the amplifier and amplifying means for amplifying the left channel signal and the right channel signal. The two signals then modulate the carrier frequencies which are and mixed together to produce a transmission signal, which is radiated by infrared diode means within the signal area.

Each of the selecting means generally includes a photodiode arrangement for receiving the infrared light carrying the transmission signal from the converting means and passing it to the respective filter means, amplifying means for amplifying the signal from the respective filter means, and at least one speaker means for receiving the signal from the amplifying means and converting it to sound signals, for radiating in the listening area.

It is thus an object of the invention to provide an audio system having a receiver or amplifier which sends its signals to loudspeakers in the system without the use of wires by which the sound signal is transmitted to the speakers.

Another object of the invention is to provide an audio system as described above wherein each loudspeaker includes means for selecting the portion of the audio signal that is applicable to itself only, and ignore the rest of the signal.

A more specific object of the invention is to provide an audio system as set forth above which can be completely battery driven, so that no wires need be attached to the speaker at all to hinder or otherwise affect its placement in the listening area.

Another specific object of the invention is to provide an audio system as described above wherein the batteries are rechargeable by circuitry employed within the speaker enclosure, allowing the user to plug the loudspeaker into a power outlet if desired to extend battery life.

Other objects and advantages of the invention will become apparent hereinafter.

DESCRIPTION OF THE PREFERRED EMBODIMENT

Figure 1:
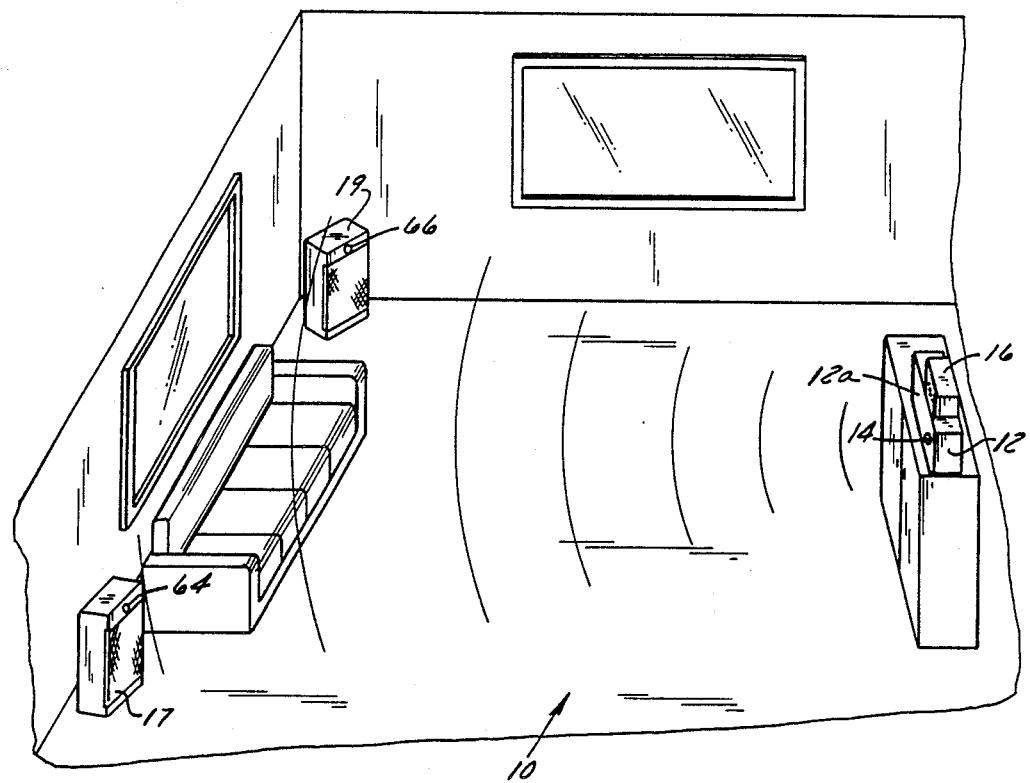
FIG. 1 is an isometric view of a listening area showing an audio system constructed according to a preferred embodiment of the invention.

Referring now to FIG. 1, there is shown a signal or listening area 10. According to the invention, a stereo receiver or amplifier, or other source 12 of an electronic audio signal, is placed within the signal/listening area 10. The source 12 includes an outlet for connection of an accessory speaker arrangement, such as a headphone jack 14, positioned conveniently, for instance on the front surface 12a of the source 12.

The invention further provides for a conversion means 16 for receiving the electrical audio signal from the source 12, converting that signal to an infrared audio signal to be radiated into the signal/listening area 10, and radiating that signal. This conversion means 16 will hereafter be referred to as the infrared transmitter or just the transmitter 16 for ease of reference. Two separate selecting means 17 and 19 are located within the signal/listening area 10, for receiving the signal from the transmitter 16. These selecting means 17 and 19 will be referred to hereafter as loudspeakers 17 and 19 for easier reference. On receiving the signal, each loudspeaker 17 and 19 selects the portion of the signal which pertains to it, whether it be the left signal or the right signal, converts that signal to sound and radiates that sound into the signal/listening area 10. The details of the transmitter 16 can be seen by reference to FIGS. 2A and 2B, while the details of the loudspeakers can be seen by reference to FIGS. 3A, 3B, 4A and 4B.

Conversion Means

Figure 2A:
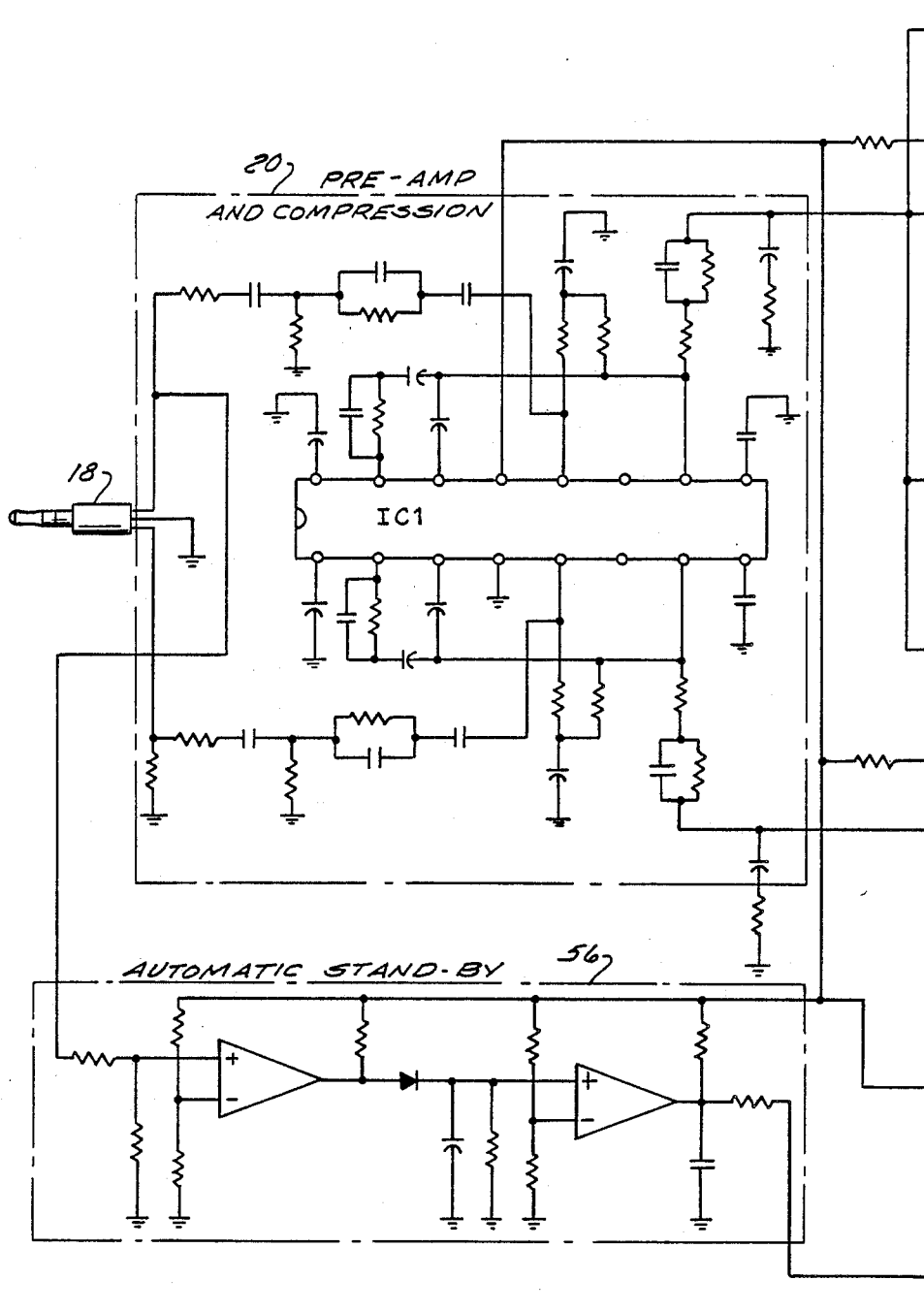
FIGS. 2A and 2B together make up a schematic circuit diagram of a transmitter constructed according to a preferred embodiment of the invention.
Figure 2B:
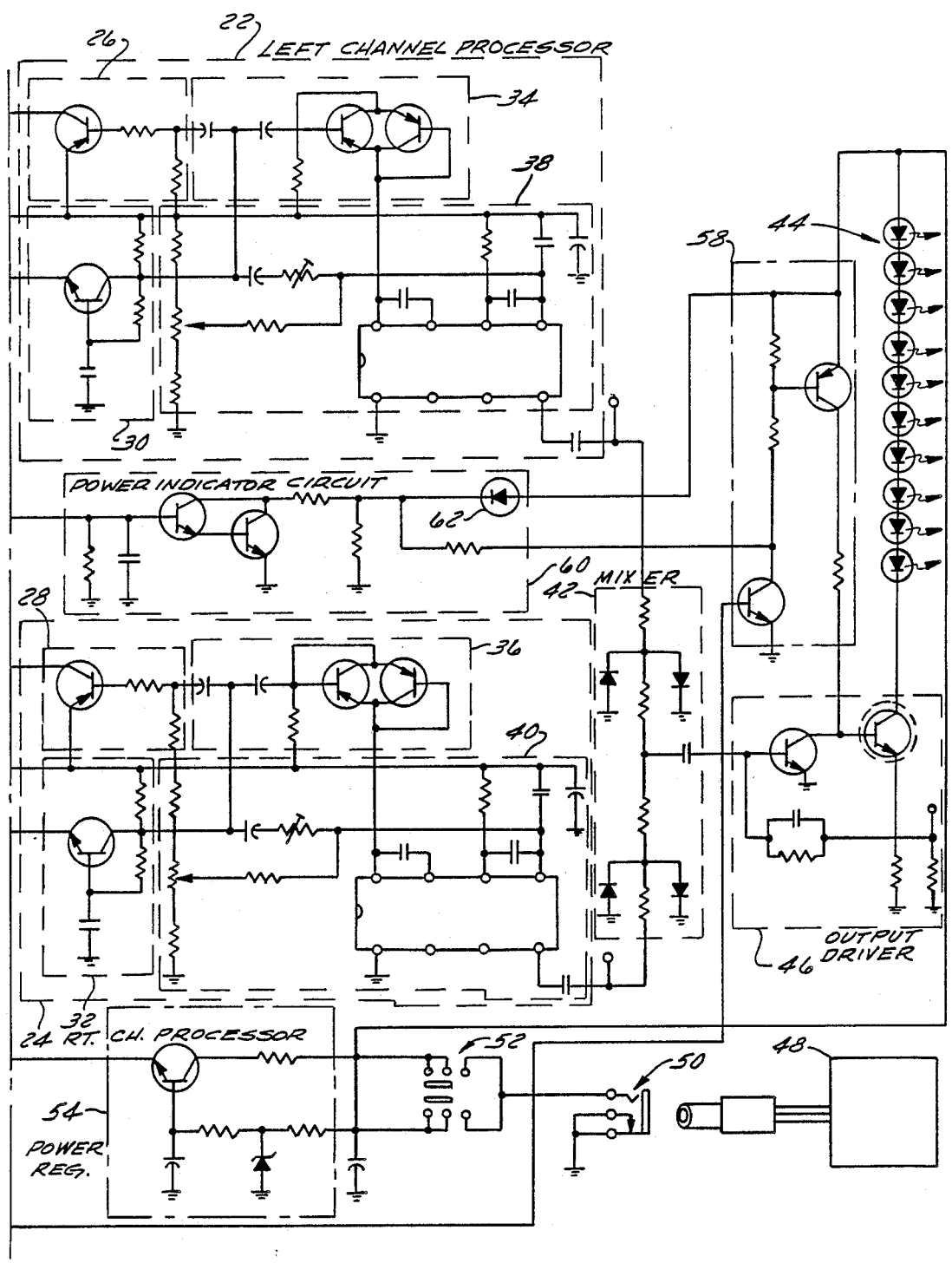

Referring now to those figures, and in particular first to FIGS. 2A and 2B, transmitter 16 is shown to include a plug 18 or other attachment means for electrically connecting the transmitter to the source 12, as referred to above, that is, by inserting plug 18 into jack 14 (FIG. 1) of the source. Hence, via plug 18, transmitter 16 receives the electrical audio signal, in both left and right channels, from the source 12. From the plug 18, the signal enters a compression and pre-amplification circuit 20, where the signal is pre-amplified and compressed for more efficient and noise-free transmission. The compression is accomplished mainly by an integrated circuit IC1, referred to as a compander. Any suitable integrated circuit may be employed as IC1, such as the Signetics NE570N.

From the compression and pre-amplification circuit 20, the left channel signal is directed to a left channel processing means 22, while the right channel signal is similarly directed to a right channel processing means 24. Each channel processing means 22 and 24 includes a power input indicator circuit 26 (left) and 28 (right) respectively. The purpose of these power input indicator 26 and 28 circuits is to provide some indication of the level of input into the transmitter. That is, if the power input level is too high, an LED power indicator circuit 60 will drive an indicator LED 62 to shine brightly, and return to a normal intensity upon reduction of the input signal to normal levels. Each channel processing means 22 and 24 further includes a matching amplifier 30 (left) and 32 (right) for impedance matching purposes and an automatic gain control circuit 34 (left) and 36 (right). Finally, each channel signal modulates a carrier signal by means of an FM modulator circuit 38 (left) and 40 (right) still within the channel processing means 22 and 24. The carrier for the left channel is preferably in the area of 95 KHz while the carrier for the right channel is preferably approximately 250 KHz.

From the separate left and right channel processing means 22 and 24, the signals are sent to a carrier frequency limiter/mixer 42, where the signals are "mixed", that is, combined together to permit transmission in a single transmission signal. Finally the transmission signal passes to the infrared light emitting diode (LED) array 44, via an infrared output driver 46. At the array, the LEDs are powered by the driver 46 so as to transmit the mixed signal by means of infrared light.

In the preferred embodiment, the transmitter 16 is powered by an AC adapter 48 which connects to a regular AC receptacle (not shown). The output of the adapter 48 is preferably 24 volts, and connects to a power jack 50, which is part of the transmitter 16. From the power jack 50, power passes through a switch 52, by which a user may turn the transmitter 16 on or off. A power regulating circuit 54 conditions the power from the switch before it is sent into the rest of the transmitter 16.

Applicants have determined that it is common for a user of the transmitter 16 to leave it on or forget to turn it off after use. Since that is true, the preferred embodiment of the transmitter 16 includes an automatic shut-off circuit 56. This circuit 56 monitors the incoming electrical audio signal, and in this case the left channel thereof. In the event of there being no carrier being input at plug 18 for a suitable time interval so as to ensure that the carrier interruption was not transient, the automatic stand-by circuit 56 effectively switches the transmitter 16 into a stand-by mode by use of a stand-by control circuit 58, effectively disabling the LED array 44. The length of the interval is determined by the values of the components. In this case the interval is determined at about 45 seconds. The purpose and operation of the stand-by control circuit 58 will be set forth in more detail in connection with the description of the circuitry of the loudspeakers.

While the LED power indicator circuit 60 does drive the LED indicator 62 to indicate an over-power condition as described above, its main purpose is to indicate when power is applied to the transmitter 16 via the power switch 52. In the preferred embodiment, the indicator LED 62 remains on regardless of the state of the stand-by control 58, whenever the transmitter power switch 52 is on.

Selecting Means

As shown in FIG. 1, the infrared signal from the transmitter 16 is radiated throughout the signal/listening area 10. Each loudspeaker 17 and 19 has a receiving means 64 and 66 respectively for receiving the infrared signal, and for selecting which portion of the signal applies to it.

Figure 3A:
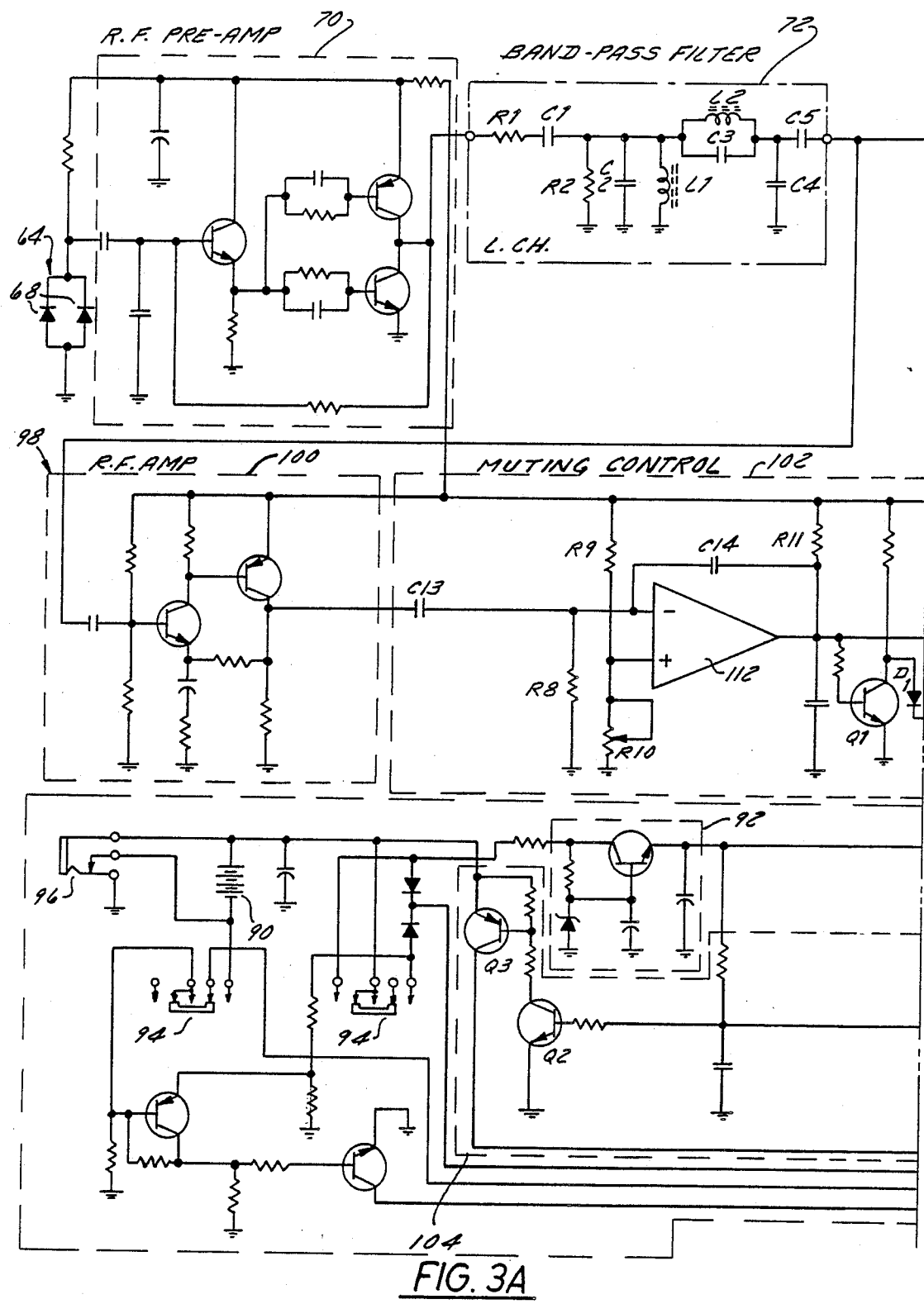
FIGS. 3A and 3B together make up a schematic circuit diagram of a left loudspeaker constructed according to a preferred embodiment of the invention.
Figure 3B:
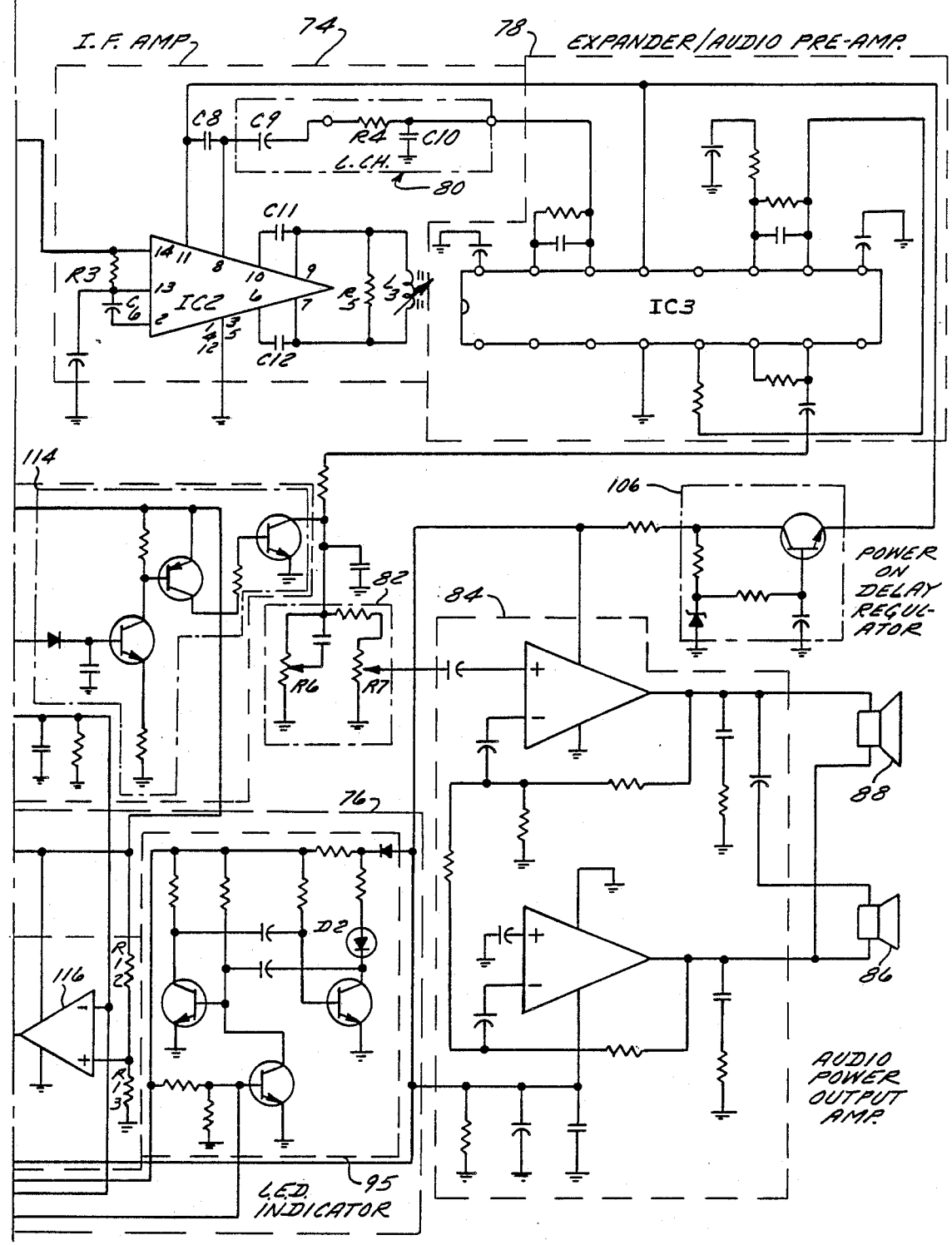
Figure 4A:
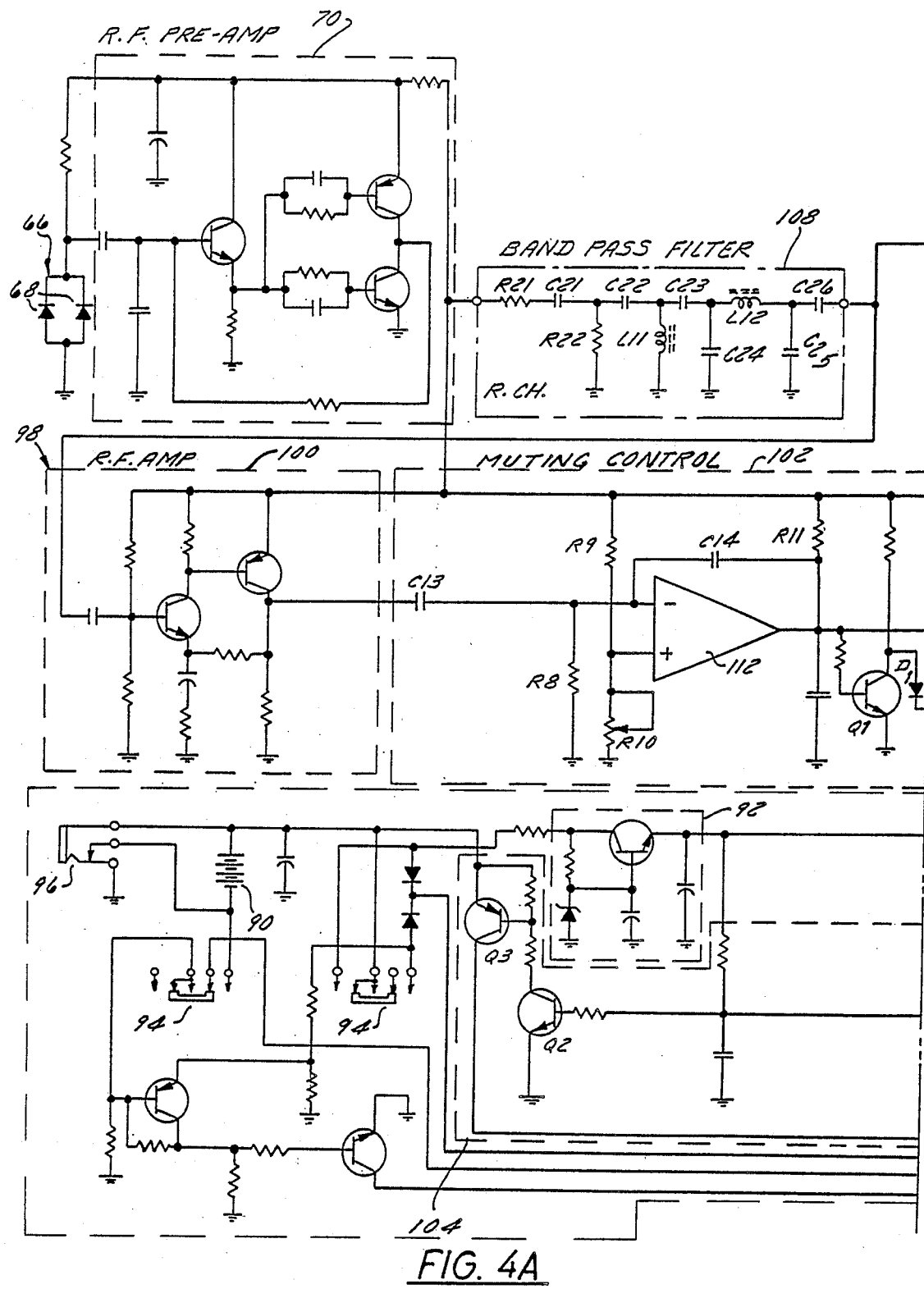
FIGS. 4A and 4B together make up a schematic circuit diagram of a right loudspeaker constructed according to a preferred embodiment of the invention.
Figure 4B:
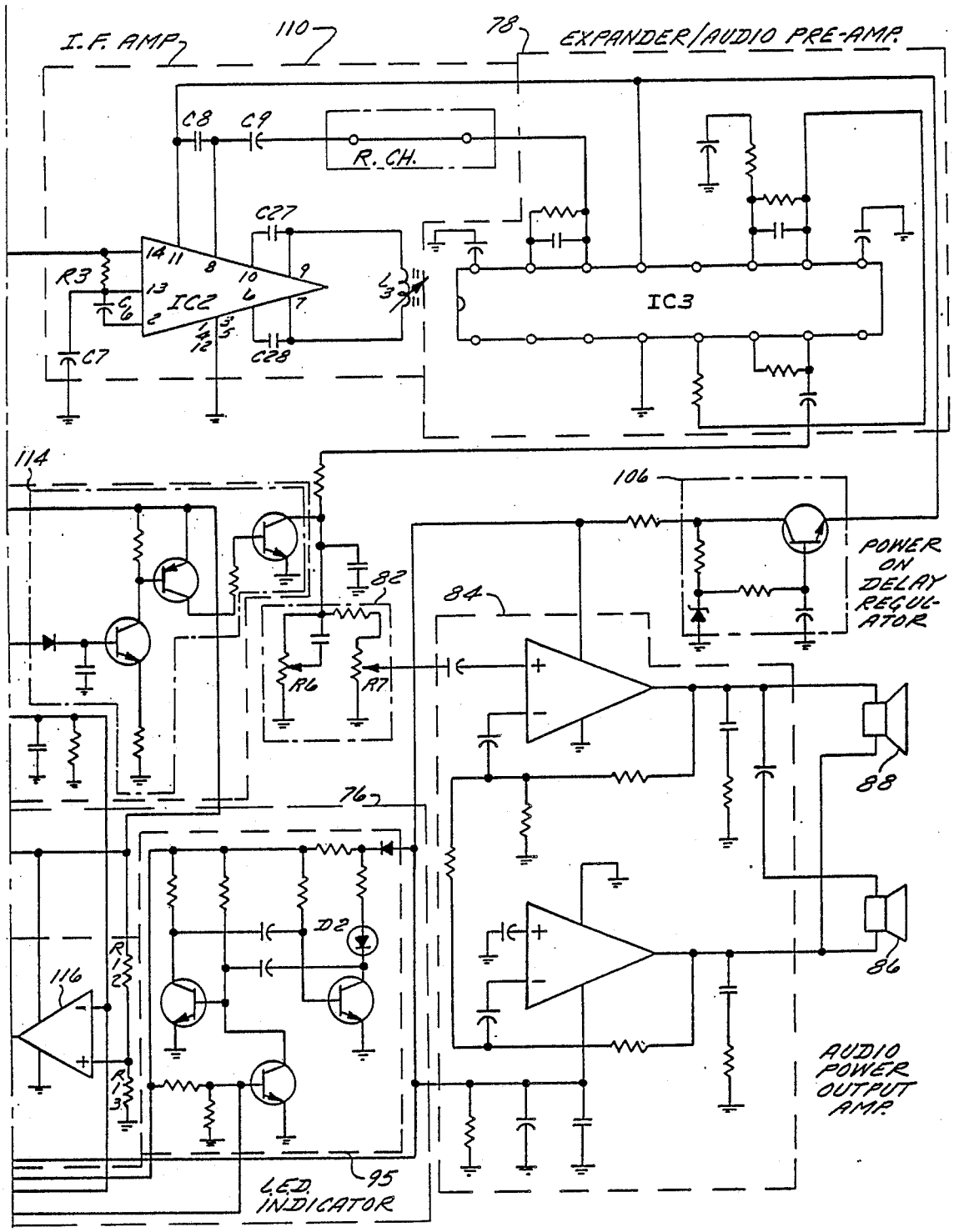

As indicated above, the detail of the loudspeakers 17 and 19 is shown at FIGS. 3A and 3B, for left loudspeaker 17, and at FIGS. 4A and 4B, for right loudspeaker 19.

Referring now to FIGS. 3A and 3B and the left loudspeaker 17, and as just mentioned, the signal from the transmitter 16 (FIG. 1) is received by receiving means 64, which in the preferred embodiment comprises a pair of photosensitive diodes 68. These diodes 68 react to infrared light to produce a received electrical signal corresponding to the transmission signal referred to above within the transmitter 16. The reason two diodes 68 are used is tat each diode 68 can only receive a signal on one side, that is, from one direction. Hence, in order to provide a receiver which is omnidirectional, that is, one which can receive a signal from any direction, two diodes 68 are used, and are arranged physically back-to-back. The signal received by the two diodes 68 is then sent to a radio-frequency (RF) pre-amplifier 70 for pre-amplification.

From the preamplifier 70, the signal is sent to a band pass filter 72. This band pass filter 72 is provided to enable the loudspeaker 17 to select the particular electrical audio signal at the predetermined carrier frequency which applies to it and exclude all other signals. In this case, since the loudspeaker 17 is a left speaker, the selected carrier frequency is the 95 KHz frequency referred to above for the left channel.

This selection is accomplished by the particular arrangement of the band pass filter 72 and the values of its components. This arrangement of components, each followed by the respective preferred value, is as follows. The values given are only preferred, since other values may be possible to accomplish the same function within the spirit of the present invention. In the preferred embodiment of the left loudspeaker 17, for the selection of the 95 KHz frequency, as shown in FIG. 3A, the signal is first sent to a resistor R1 (2.2K ohm) and a capacitor C1 (0.002 ufd) in series. Next, the signal passes over a resistor R2 (10K ohm), a capacitor C2 (600 pfd) and an inductor L1 (4.7 mH), arranged in parallel between the output of C1 and ground. Then, the signal passes through a parallel arrangement of an inductor L2 (4.7 mH) and a capacitor C3 (82 pfd). Finally, the signal passes over a capacitor C4 (330 pfd) arranged between the output of the L2-C3 arrangement and ground, and through another capacitor C5 (330 pfd) to exit the band pass filter 72.

From the band pass filter 72 the signal, now filtered so as to only have the 95 KHz carrier, having had the 250 KHz carrier and its accompanying audio signal removed, passes to an intermediate frequency (IF) amplifier 74 for further amplification of the selected signal. The main functional element of the IF amplifier 74 is an integrated circuit IC2, which is preferred to be a Syllax Model 111-0204 integrated circuit. The signal enters from the band pass filter 72 at pin 14 of IC2. Pins 1, 3, 4, 5 and 12 are grounded. Pin 14 is connected to pin 13 by a resistor R3 (4.7K Ohm). In addition, pin 2 is connected to pin 13 by a capacitor C6 (47 ufd). Pin 13 is in turn connected to ground via a capacitor C7 (10 ufd). Pin 11 is connected to a power supply/indication circuit 76, the detail of which will be set forth later in this description. Pin 8 is connected to pin 11 by a capacitor C8 (0.0068 ufd) and to an expander/audio preamplifier circuit 78 by a filter circuit 80. In left loudspeaker 17, filter circuit 80 includes a capacitor C9 (2.2 ufd) in series with a resistor R4 (2.2K ohm), and a capacitor C10 (0.002 ufd) connected between the output of the resistor R4 and ground. Pins 9 and 10 are connected by a capacitor C11 while, similarly, pins 6 and 7 are connected by a capacitor C12. In the left loudspeaker 17, the values of both capacitors C11 and C12 are preferred to be 820 pfd. Finally, pins 7 and 9 are connected by a resistor R5 (3.9K ohm) and an adjustable coil L3.

As indicated above, the audio signal passes from the IF amplifier 74 into the expander/audio pre-amplifier 78. The purpose of this circuit is to expand the signal which was compressed by the compressor/pre-amplifier circuit 20 of the transmitter 16, shown in FIG. 2. For this reason the main functional element of the expander/audio pre-amplifier circuit 78 is another compander integrated circuit IC3, which is preferably another Signetics NE570N integrated circuit, similar to the one used in the transmitter 16.

From the expander/audio pre-amplifier circuit 78, the signal passes to a tone and volume control 82, then to an audio power output amplifier 84 and finally to speaker elements 86 and 88. In the embodiment shown in FIG. 3, two such speaker elements are shown, although any suitable number in any suitable combination of types may be used, as is well known in the art of loudspeaker construction. Speaker element 86 is shown to be a tweeter, while speaker element 88 is a woofer. Within the tone and volume control 82, control of the tone of the audio signal is accomplished by a variable resistor R6, while control of the volume is accomplished by use of another variable resistor R7.

As indicated above, power for the entire circuit of the loudspeaker 17 is provided by a power supply 76. In the preferred embodiment the power supply 76 includes a self contained power source 90 of preferably 12 volts, such as eight conventional "D" cells. The power supply 76 further includes a generally conventional power regulator 92, and is controlled by a suitable switch means 94. A charging receptacle 96 is provided in the preferred embodiment so as to allow the user to recharge the batteries 90 rather than simply replace them, to reduce the cost of use of the loudspeaker 17.

Power Saver Means

As previously described, applicants have determined that it would be desirable to provide means for preserving battery power in the event that the user would fail or forget to turn off the system when not in use. To this end, as mentioned briefly above, there is provided in the preferred embodiment a power saver means 98 in the loudspeaker 17 for cutting battery drain in response to a loss of carrier due to the transmitter 16 disabling its LED array 44. That way, when the transmitter 16 senses that it is no longer receiving a signal from the audio signal source 12, meaning that the receiver or amplifier has probably been turned off without the transmitter and speakers having been turned off, the transmitter disables the LED array 44. Upon the LED array 44 being disabled, the loudspeaker 17 no longer receives an LED signal. Upon the determination that the loudspeaker 17 is no longer receiving a signal, the power saver means 98 cuts power to the audio power output amplifier 84, which is the main power user within the loudspeaker. Later, when the signal is resumed, the LED array 44 of the transmitter 16 is re-enabled and the signal transmitted to the loudspeaker 17, which in turn results in the power saver means 98 reconnecting power to the audio power output amplifier 84.

In the preferred embodiment, the power saver means 98 includes an RF amplifier 100 for receiving a signal from the output of the band pass filter 72 and further amplifying it. The power saver means 98 further includes a muting control circuit 102, which receives the amplified RF signal from the RF amplifier 100. As long as the signal is received from the RF amplifier 100, the muting control circuit 102 does not affect the operation of the audio portion of the loudspeaker 17. However, when the muting control 102 no longer receives this signal, such as when the transmitter LED array 44 is disabled as referred to above, or even if the signal would be interrupted by imposition of some obstacle or other interference between the transmitter 16 and the loudspeaker 17, the muting control circuit 102 outputs an interrupt signal as follows. The signal from the RF amplifier 100 passes through an RC filter comprising a resistor R8 (4.7K Ohm) and a capacitor C13 (0.001 uF) before reaching the minus input of a comparator 112. The level of the plus input of the comparator 112 is controlled by a voltage divider network including a resistor R9 (330K Ohm) between the source and the input and a variable resistor R10 (max. 2.2K Ohm) between the input and ground. The minus input of comparator 112 is further filtered by another RC filter network including a resistor R11 (10K Ohm) and a capacitor C14 (820 pfd). Thus when the signal from the RF amplifier 100 drops below a level determined by the setting of the variable resistor R10, the comparator 112 issues a signal via its output terminal. This signal is sent to a transistor network 114, which shunts the audio signal from the expander/audio pre-amplifier circuit 78 to the tone and volume controls R6 and R7, after a suitable time delay to ensure that the interruption is not transient. In addition, the signal from the output of the comparator 112 is also sent to a power interrupt circuit 104, which is part of the power supply 76. The signal is sent via an arrangement of a transistor Q1 and a diode D1, and via suitable delay circuitry to again ensure that the interruption is not transient, to the plus input of a comparator 116, the level of the minus input being determined by a voltage divider comprising two resistors R12 (1 MegOhm) and R13 (150K Ohm) The comparator 116 then sends an output signal via a current limiting resistor R14 to a transistor Q2, which in turn controls another transistor Q3. Transistor Q3 controls connection of power to audio power output amplifier 84 and expander/audio pre-amp 78. Hence, when the carrier is interrupted, amplifier 84 is powered down. Since these components are the major users of power in the circuit, substantial extension of the life of the batteries can be achieved by de-energizing these components when not in use. Thereafter, when an amplified RF signal is received by the muting circuit 102, Q3 is re-energized forthwith, that is, without delay from interrupt circuit 104.

Similar to the time interval disclosed above with respect to the transmitter 16, the length of the time delay is determined by the values of the components, with the preferred time delay being about 30 seconds.

In any case, whenever power is applied to the amplifier 84, whether by the power interrupt circuit 104 or by the switch 96, a power-on delay regulator 106 interjects a very short delay, usually on the order of about three seconds, before allowing power to get through to the amplifier itself. The purpose for this is that the short delay gives the other components time to stabilize before actually sending an audio signal to the speaker elements 86 and 88. This eliminates a transient but aesthetically objectionable spurt of noise which would otherwise issue from the loudspeaker 17 on power up.

In the preferred embodiment, a status indicator 95 is included in the power supply 76, including an LED D2 for indicating the status of the loudspeaker circuit. When the power is off by the switch 96, the LED will be off. When the power is on, the LED will be on at a steady but intermediate brightness. When charging, the LED will be on a more intense brightness. When in standby mode, that is when power to the audio power output amplifier 84 is interrupted as described above, the LED will be on at a steady but very dim intensity. When the power source 90 is in need of charging, the LED will flash dimly. When the power source 90 is over charged, the LED will flash brightly.

Referring now to FIGS. 4A and 4B, there is shown the detail of the right loudspeaker 19. The structure and operation of loudspeaker 19 is substantially similar to the structure and operation of loudspeaker 17, with the exception of the structure of the band pass filter and portions of the IF amplifier, and certain values of resistors and capacitors in other parts of the circuit. The reason for these differences is that the carrier for the right channel, as set forth above, is 250 kHz, rather than the 95 kHz carrier of the left channel. The values of certain of the components must be adjusted to accommodate the different carrier.

The selection of the proper carrier value is again accomplished by the particular arrangement and values of the components a band pass filter 108 which receives a signal from the RF pre-amplifier 70. This arrangement of components, each followed by the respective preferred value, is as follows. The values given are only preferred, since other values may be possible to accomplish the same function within the spirit of the present invention. In the preferred embodiment of the right loudspeaker 19, for the selection of the 250 KHz frequency, as shown in FIG. 4A, the signal is first sent to a resistor R21 (3.9K ohm) and a capacitor C21 (0.001 ufd) in series. Next, the signal passes over a resistor R22 (6.8K ohm) connected to ground, to a capacitor C22 (470 pfd). The signal then passes over an inductor L11 (1 mH) connected to ground and on through a capacitor C23 (330 pfd), over a capacitor C24 (0.0015 ufd) connected to ground, through an inductor L12 (1 mH), over yet another capacitor C25 (470 pfd) connected to ground and finally through a capacitor C26 (470 pfd) to exit the band pass filter 108.

As with left loudspeaker 17, the signal from the band pass filter 108 is fed to an IF amplifier 110. Again the main filter 108 is fed to an IF amplifier 110. Again the main functional component of the IF amplifier 110 is integrated circuit IC2, the same as in left loudspeaker 17, that is, preferably a Syllax Model 111-0204 integrated circuit. The various pins of IC2 are connected as described above for the left loudspeaker 17 with the following exceptions. Pin 8, while again being connected to pin 11 by the capacitor C8, is connected to the expander/audio pre-amplifier 78 solely by the capacitor C9, without the rest of the filter 80 contained in left loudspeaker 17. As with the left loudspeaker, pins 9 and 10 are connected together by capacitors C27, while pins 6 and 7 are connected together by capacitors C28. Here, however, the values are 300 pfd rather than the 820 pfd specified for capacitors C11 and C12 of FIG. 3. In addition, the pins 7 and 9 are connected together only by an adjustable inductor L3, there being no resistor corresponding to resistor R5 of FIG. 3.

The only other difference between the circuits of the two loudspeakers is in muting control 102, where capacitor C14 is 600 pfd rather than the 820 pfd of the left speaker. The rest of the circuit of the right loudspeaker 19 shown in FIGS. 4A and 4B is the same in structure and operation as that of the left loudspeaker 17 shown in FIGS. 3A and 3B.

While the apparatus hereinbefore described is effectively adapted to fulfill the aforesaid objects, it is to be understood that the invention is not intended to be limited to the particular preferred embodiments of infrared stereo speaker system herein set forth. Rather, it is to be taken as including all reasonable equivalents without departing from the scope of the appended claims.

We claim:

1. A stereophonic audio system, comprising:
   source means for providing a source of analog electric signals containing stereophonic signal information, including an analog left channel signal and an analog right channel signal;
   converting means for receiving said analog electric signals, for converting said analog electric signals to a single analog infrared signal containing both of said channel signals, and for radiating said single analog infrared signal throughout a signal area;
   first electronic selecting means for disposition within said signal area for receiving said single analog infrared signal, for selecting one portion of said single analog infrared signal, for converting said one portion of said single analog infrared signal to a first audible sound signal corresponding to said right channel signal, and for radiating said audible sound signal throughout a listening area; and
   second electronic selecting means for disposition within said signal area but remote from said first selecting means for receiving said single analog infrared signal, for selecting another portion of said single analog infrared signal corresponding to said left channel signal, for converting said another portion of said single analog infrared signal to a second audible sound signal, and for radiating said second audible sound signal throughout said listening area.

2. A stereophonic audio system as recited in claim 1 wherein said first selecting means includes filter means for filtering out any infrared signal other than said one portion and producing a first filtered signal, and
   wherein said second selecting means includes filter means for filtering out any infrared signal other than said another portion and producing a second filtered signal.

3. A stereophonic audio system, comprising:
   source means for providing a source of analog electric signals containing stereophonic signal information;
   converting means for receiving said analog electric signals, for converting said analog electric signals to an analog infrared signal containing said stereophonic signal information, and for radiating said analog infrared signal throughout a signal area;
   first electronic selecting means for disposition within said signal area for receiving said analog infrared signal, for selecting one portion of said analog infrared signal, for converting said one portion of said analog infrared signal to a first audible sound signal, and for radiating said audible sound signal throughout a listening area; and
   second electronic selecting means for disposition within said signal area but remote from said first selecting means for receiving said analog infrared signal, for selecting another portion of said analog infrared signal, for converting said another portion of said analog infrared signal to a second audible sound signal, and for radiating said second audible sound signal throughout said listening area;
   said first selecting means including filter means for filtering out any infrared signal other than said one portion and producing a first filtered signal; and
   said second selecting means including filter means for filtering out any infrared signal other than said another portion and producing a second filtered signal;
   said source means including a stereo audio amplifier providing an analog left channel signal and an analog right channel signal and having a headphone jack for allowing connection to both said channel signals; and
   said converting means including a plug engageable with said headphone jack for electrically connecting said converting means to said stereo audio amplifier, amplifying means for amplifying said analog left channel signal and said analog right channel signal, mixing means for removably mixing said analog left channel signal and said analog right channel to produce an analog transmission signal, and infrared diode means for radiating infrared light carrying said analog transmission signal within said signal area.

4. A stereophonic audio system as recited in claim 3 wherein each said selecting means includes:
   photodiode means for receiving said infrared light carrying said analog transmission signal from said converting means and passing it to said respective filter means,
   amplifying means for amplifying said first or second filtered signal from said respective filter means and producing an amplified signal, and
   at least one speaker means for receiving the amplified signal from said amplifying means of said selecting means and converting the amplified signal to sound signals, for radiating in said listening area.

5. A stereophonic audio system as recited in claim 4 wherein said converting means further comprises power saver means for temporarily disabling said converting means, while said converting means detects no signal from said source means.

6. A stereophonic audio system as recited in claim 5 wherein said power saver means further comprises means disposed within each selecting means for temporarily disabling said amplifying means of said selecting means while said selecting means receives no signal from said converting means.

7. A stereophonic audio system as recited in claim 4 wherein said converting means further comprises power saver means for temporarily disabling said converting means after a predetermined length of time after said converting means detects no signal from said source means.

8. A stereophonic audio system as recited in claim 5 wherein said power saver means further comprises means disposed within each said selecting means for temporarily disabling each said amplifying means of said selecting means after a predetermined length of time after each said selecting means receives no signal from said converting means.

* * * * *